United States Patent
Okumura et al.

(10) Patent No.: US 6,892,459 B2
(45) Date of Patent: May 17, 2005

(54) RECIPROCATING CUTTING TOOLS HAVING DEVICES FOR LIMITING SCATTERING OF CUTTING CHIPS

(75) Inventors: Michio Okumura, Aichi-ken (JP); Yuji Takahashi, Aichi-ken (JP); Masaki Kondo, Aichi-ken (JP); Hidenori Ito, Aichi-ken (JP); Shinji Hirabayashi, Aichi-ken (JP)

(73) Assignee: Makita Corporation, Anjo (JP)

( * ) Notice: Subject to any disclaimer, the term of this patent is extended or adjusted under 35 U.S.C. 154(b) by 77 days.

(21) Appl. No.: 10/152,354

(22) Filed: May 22, 2002

(65) Prior Publication Data

US 2002/0178588 A1 Dec. 5, 2002

(51) Int. Cl.⁷ .......................... B23D 49/16; B27B 19/09
(52) U.S. Cl. ........................... 30/123.3; 30/124; 30/392
(58) Field of Search .................. 30/123.3, 124, 30/133, 392, 393, 374

(56) References Cited

U.S. PATENT DOCUMENTS

| | | | |
|---|---|---|---|
| 3,206,989 A | * 9/1965 | Enders | ........................ 30/392 |
| 4,195,403 A | 4/1980 | Gruber | |
| 4,628,605 A | 12/1986 | Clowers | |
| 4,665,617 A | * 5/1987 | Maier et al. | ................... 30/392 |
| 4,730,397 A | 3/1988 | Weiford et al. | |
| 4,870,755 A | * 10/1989 | Schnizler | ................... 30/123.3 |
| 5,012,583 A | * 5/1991 | Blochle et al. | ............... 30/392 |
| 5,199,174 A | 4/1993 | Wild | |
| 5,479,709 A | * 1/1996 | Lai | ........................... 30/123.3 |
| 5,680,704 A | 10/1997 | Okubo et al. | |

FOREIGN PATENT DOCUMENTS

| | | |
|---|---|---|
| DE | 7919565 | 10/1979 |
| DE | 37 17 585 A1 * | 12/1988 |
| EP | 0221652 | 5/1987 |
| EP | 0 347 631 A2 * | 6/1989 |
| EP | 0521263 | 1/1993 |
| EP | 0658389 | 6/1995 |

* cited by examiner

*Primary Examiner*—Hwei-Siu Payer
(74) *Attorney, Agent, or Firm*—Dennison, Schultz, Dougherty & MacDonald (57) ABSTRACT

Reciprocating cutting tools (1, 90, 100) may include a drive source (11) for reciprocally driving a blade (B). The drive source may also drive a blower (13) in order to generate an air stream. An air channel (50, 56, 50, 70, 85, 80) may guide the air stream to a position adjacent to the blade or a workpiece (W) that will be cut by the blade. Further, a chip collector nozzle (57) may draw or suction cutting chips away from the workpiece that has been cut by the blade.

26 Claims, 10 Drawing Sheets

RECIPROCATING CUTTING TOOLS HAVING DEVICES FOR LIMITING SCATTERING OF CUTTING CHIPS

BACKGROUND OF THE INVENTION

1. Field of the Invention

The present invention relates to reciprocating cutting tools, such as jigsaws, which reciprocally move a blade in order to cut a workpiece. More particularly, the present invention relates to reciprocating cutting tools having devices for limiting cutting chips that may be produced during a cutting operation from scattering. The present invention also relates to methods for limiting the scattering extent of the cutting chips.

2. Description of the Related Art

Japanese Laid-open Utility Model Publication No. 6-75705 discloses a jigsaw that has a substantially U-shaped cover. The cover surrounds the front, right and left sides of a blade in order to prevent cut pieces and cutting chips from scattering to the surrounding area. According to this arrangement, the cover contains the cut chips and prevents the cut chips from scattering outside of the cover. Further, a chip collection nozzle is attached to the cover in order to draw cut chips from within the cover to a dust collection bag or other container.

In order to enable an operator to observe the portion of the workpiece that is being cut, the cover is a transparent resin plate. However, the cutting chips that have separated from the cut portion may stick to the inner surface of the transparent cover, thereby preventing the operator from observing the cut portion of the workpiece during the cutting operation. As a result, the cutting operation may be hindered.

SUMMARY OF THE INVENTION

Therefore, one object of the present teachings is to provide improved reciprocating cutting tools that can be operated more easily and reliably.

In one of the aspect of the present teachings, reciprocating cutting tools are taught that may have a drive source, e.g., a motor, for reciprocating a blade. The drive source also may drive a blower that produces an air stream. The air stream may flow through an air channel and may reach a position adjacent to a blade and/or a portion of a workpiece that will be cut by the blade. The air stream then may be exhausted from the air channel in order to efficiently collect the cut chips in a dust collection bag or other container.

Therefore, according to this aspect of the present teachings, it is not necessary to use a transparent cover, as in the known device. Further, the cut chips (that may stick to the transparent cover in the known tool) will not prevent the operator from observing the cut portion of the workpiece. As a result, the operability of the reciprocating cutting tools may be improved and operation efficiency may be improved.

In addition, if the drive source for the blade is also used to drive the blower, an additional drive source is not required. Therefore, manufacturing costs are not significantly increased to provide both functions. Further, such cutting tools can be easily handled during the cutting operation, because an additional drive source (e.g., that must be attached to the tool body) is not required.

The direction of the air stream is not particularly limited. For example, the air stream may flow in a substantially horizontal (perpendicular) direction across the blade or may be flow in a vertical (parallel) direction. In either case, the air stream preferably urges the cutting chips to flow with the air stream, thereby preventing scattering of the cutting chips.

In one embodiment of the present teachings, the air stream may be exhausted towards a chip collection nozzle or a suction nozzle of a chip collecting device. In this case, the suction nozzle may be disposed on the side opposite to the air stream and adjacent to the portion of the workpiece that is being cut. As a result, cutting chips may be efficiently collected.

According to another aspect of the present teachings, the drive source may include an electric motor that is coupled to a drive mechanism. For example, the drive mechanism may convert rotation of the motor into reciprocating movement of the blade. In this case, the air stream may flow around the motor and also may flow around the drive mechanism and the air stream may cool both the motor and the drive mechanism. Thus, the air stream may be effectively utilized to cool both the motor and drive mechanism and to collect cutting chips.

According to another aspect of the present teachings, the air channel may include a first flow channel and a second flow channel. The second flow channel may have an exhaust opening and may be connected to the first flow channel, so that the exhaust opening is positioned in response to the desired exhaust direction relative to the blade or the suction nozzle. The first flow channel may have its own exhaust opening when the second flow channel is disconnected.

According to another aspect of the present teachings, the first flow channel may be defined within a hollow support shaft that pivotally supports a backup device for the blade.

According to another aspect of the present teachings, the second flow channel may be defined within a cover that is disposed or positioned on the front side of the blade. The cover may be pivotally mounted on a tool housing via a support shaft. In this case, the cover may pivot between a closed position, in which the front side of the blade is covered, and an open position, in which the front side of the blade is exposed. In one optional embodiment, the cover may detachably couple with a blade holder, so that the blade holder clamps the blade when the cover pivots to the closed position and the blade holder unclamps or releases the blade when the cover pivots to the open position.

According to another aspect of the present teachings, methods are taught for preventing cutting chips from scattering during a cutting operation. In another embodiment of the present teachings, an air stream may be generated by driving a blower, e.g., using the drive source that reciprocally drives the blade. The air stream is then preferably guided or directed along an air channel to a position around the blade and/or a portion of the workpiece that will be cut by the blade. The air stream is then preferably exhausted from the air channel, whereby cutting chips are carried away from the blade and the power tool.

In other embodiments of the present teachings, the air stream may be blown in a rearward direction from the forward position of the blade, in a lateral direction from one of right and left sides to the other side of the blade, or in a downward direction at the forward position of the blade.

In another embodiment, the cut chips may be drawn out of the air channel by a chip collecting device. For example, the chip collecting device may include a suction opening that is positioned opposite to the exhaust direction of the air stream.

Additional objects, features and advantages of the present invention will be readily understood after reading the following detailed description together with the accompanying drawings and the claims.

DETAILED DESCRIPTION OF THE INVENTION

In another embodiment of the present teachings, reciprocating cutting tools may include a motor that serves as a drive source. A drive mechanism may convert the rotation of the motor into reciprocating movement of a blade, so that the reciprocating blade may cut a workpiece. The motor may also drive a fan or blower in order to produce an air stream for cooling the motor. An air channel may be defined to guide the air stream, so that the air stream may be blown out or exhausted toward or adjacent to the blade or a portion of a workpiece that will be cut by the blade. Cutting chips produced at the cut portion may be drawn into a chip collection nozzle, which nozzle may be connected to a chip collecting device.

Because the air stream, i.e. the cooling air, may limit the extent that the cutting chips will scatter, the operator can observe the cut portion of the workpiece through the air stream without interference by the cutting chips. Thus, the problems of known devices that utilize a transparent cover, to which the cutting chips may adhere, can be overcome. Furthermore, the cutting devices can be reliably and efficiently operated. In addition, by limiting the scattering of the cutting chips, the collection nozzle can efficiently draw the cutting chips away from the blade during the cutting operation.

If the motor is utilized to both reciprocate the blade and generate the air stream, no additional drive device is required. Thus, two functions can be performed by substantially the same components.

In another embodiment of the present teachings, a holder may pivot about a support shaft that is mounted on a housing of the tool. In this case, the holder can swing or pivot within a plane that is substantially parallel to the blade surface. Backup rollers may be rotatably mounted on the holder and may contact the rear edge of the blade. In this case, the rollers may support the blade from the side opposite to the moving direction of the cutting tool against the cutting resistance that is typically produced during the cutting operation. If the holder can pivot about the support shaft, the position of the backup rollers can change in the forward and rearward directions in order to change the width of the elliptical orbit of the blade during the cutting operation.

For example, the support shaft may comprise a hollow tube. The interior of the hollow tube may communicate with a space that is defined within the housing on the downstream side of the fan or blower. An air-exhaust nozzle may be connected to the support shaft, so that the air stream from the fan may flow through the support shaft and the air-exhaust nozzle and then may be blown out (exhausted) to the outside via an exhaust opening of the air-exhaust nozzle. Thus, in this embodiment, the support shaft and the air-exhaust nozzle may define the air channel for the air stream.

Further, according to this arrangement, the air-exhaust nozzle may be disposed so as to detour around (avoid) the blade and extend to the front side or the lateral side in the cutting direction. Therefore, the air stream exhausted from the air-exhaust nozzle can effectively limit the extent of scattering of the cutting chips with respect to the front or lateral side in the cutting direction.

In another embodiment of the present teachings, the air stream may be exhausted directly from the support shaft. The support shaft may be disposed on the rear side of the blade and may have an inlet port and its own air-blowing opening. Therefore, the air stream may be blown forwardly from the support shaft and the cutting chips may be urged forwardly of the cut portion.

In another embodiment of the present teachings, the blade may be mounted on the lower end of a rod via a blade mounting device or a blade holder. The drive mechanism may cause the rod to reciprocally move. An airflow channel may be connected to (communicate with) the space defined within the housing on the downstream side of the fan. The airflow channel may extend to a position on the lower side of the drive mechanism, so that the air stream may be exhausted downward from the airflow channel. According this arrangement, the air stream also may be used for cooling the drive mechanism.

For example, the airflow channel may be connected to (communicate with) a vertical slot formed in a cover, which cover may be disposed on the front side of the blade. In this case, the air stream may be blown out from a position adjacent to the blade or the cut portion in order to effectively limit the scattering extent of the cutting chips. In addition, the cover may serve to prevent the blade holder from interfering with other parts or foreign articles. Furthermore, the cover may be configured such that the cover does not prevent the operator from observing the cut portion.

In another embodiment of the present teachings, reciprocating cutting tools may include an electric motor that serves as a drive source for reciprocally moving a blade. The electric motor may also drive a fan or blower in order to generate a flow of cooling air for cooling the motor. Further, after cooling the motor, the cooling air may be directed toward a cut portion of a workpiece in order to urge cutting chips toward a collection nozzle, which may be disposed adjacent or proximal to the blade and/or the cut portion of the workpiece.

Such cutting tools may further include a holder supported on a tool body or housing via a support shaft. Preferably, the holder can pivot in the direction of a blade surface. Also, a backup roller may be rotatably supported on a pivotal end of the support shaft and the backup roller may support the blade along a lateral direction of the blade. The support shaft may have a substantially hollow interior that communicates with the fan or blower. An exhaust nozzle may communicate with the hollow interior of the support shaft. In that case, cooling air from the motor may be exhausted from the exhaust nozzle towards the cut portion of the workpiece.

In another embodiment of the present teachings, reciprocating cutting tools may include a motor disposed within a body or housing. A reciprocating drive mechanism may be coupled to a rod and may serve to convert rotational movement of the motor into reciprocating movement of the rod. A blade may be mounted on the rod. An air flow channel may be defined within the body or housing so as to communicate with a fan driven by the motor. Preferably, the cooling air is directed by the air flow channel to first cool the motor and is then directed towards the cut portion of the workpiece.

Such cutting tools may further include a cover or collar pivotally coupled to the housing. An air exhaust slot may be defined within the cover and an upstream side may communicate with the air flow channel downstream of the fan. In this case, the air flow may be exhausted through the air exhaust slot defined within the cover.

In another embodiment of the present teachings, reciprocating cutting tools may include a motor reciprocally driving a blade. A holder may be supported on a tool housing or tool body via a support shaft. For example, the holder preferably can pivot towards the blade. A backup roller may be disposed within the tool housing in order to bias the blade towards a cutting direction. The support shaft is preferably substantially hollow and the hollow interior of the support shaft communicates with a fan driven by the motor. Cooling air from the fan is preferably directed via the support shaft to the cutting portion of the workpiece.

Each of the additional features and teachings disclosed above and below may be utilized separately or in conjunction with other features and teachings to provide improved reciprocating cutting tools and methods for designing and using such reciprocating cutting tools. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present-teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
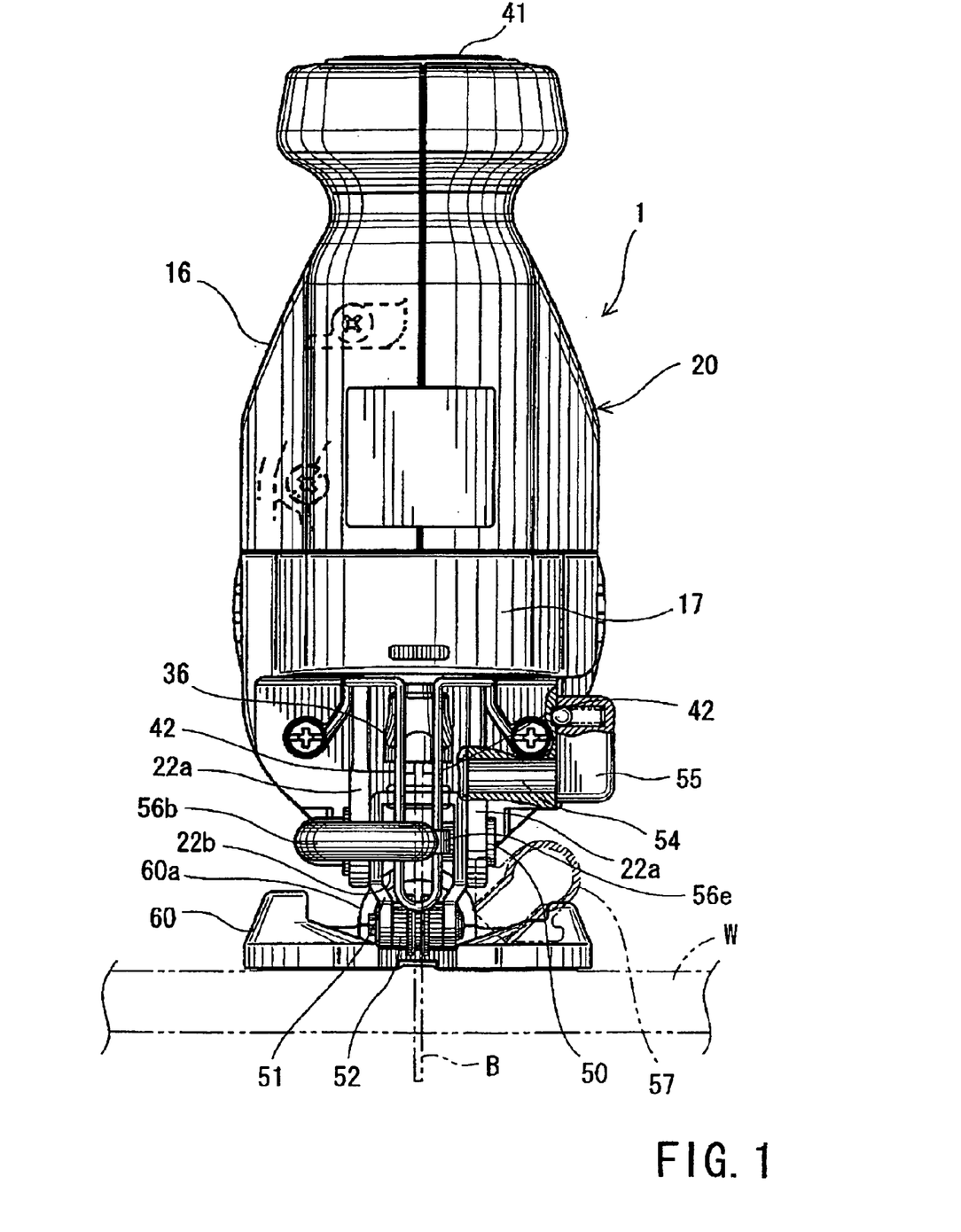
FIG. 1 is a front view of a first representative jigsaw.
Figure 2:
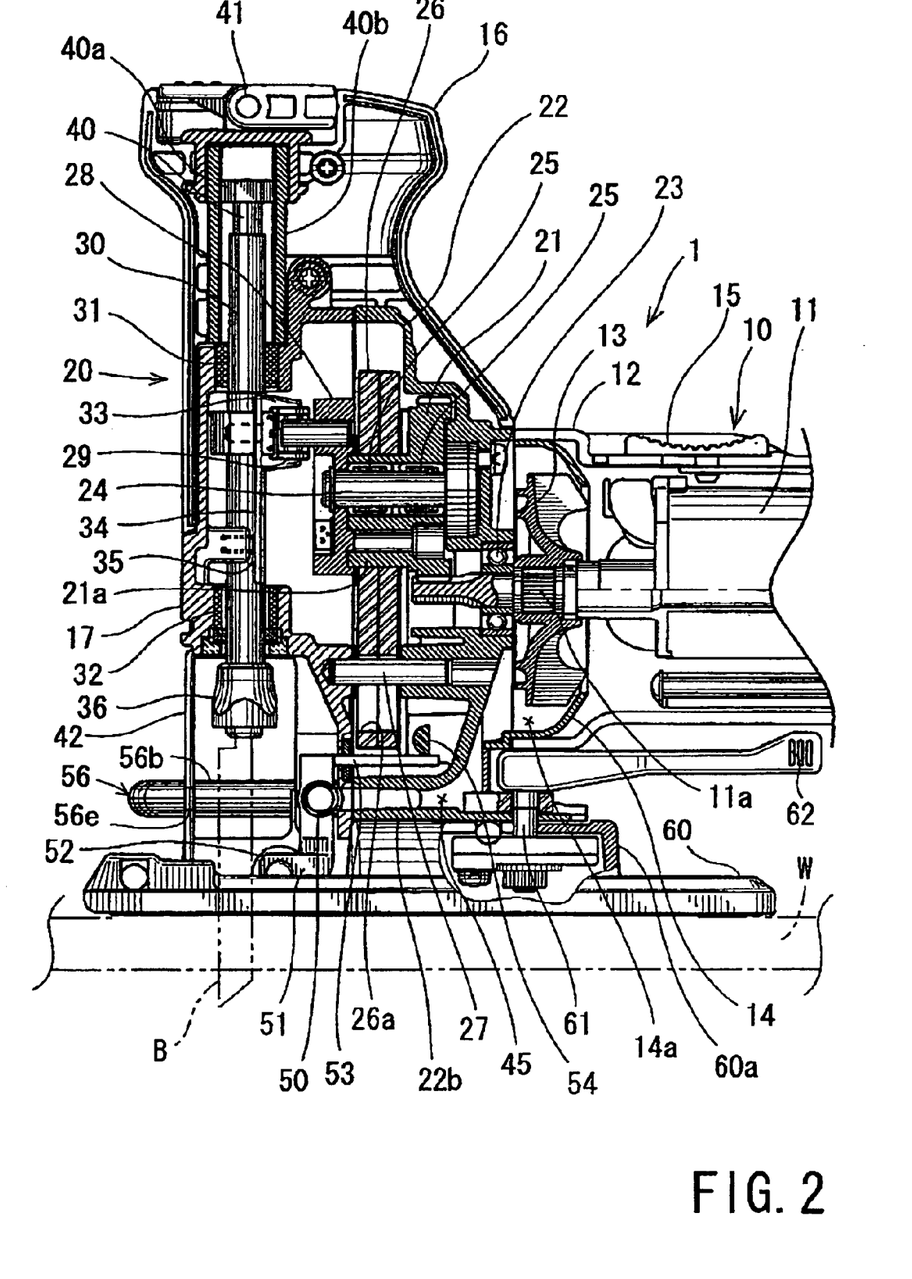
FIG. 2 is a side cross-sectional view of the first representative jigsaw.

A first representative jigsaw 1 will now be described with reference to FIGS. 1 to 6. As shown in FIGS. 1 and 2, the representative jigsaw 1 may include a main body 10 that includes a main housing 12. An electric motor 11 may be disposed within the main housing 12. A drive mechanism 20 may be disposed on the front side (left side as viewed in FIG. 2) of the main portion 10. A shoe 60 may be disposed on the lower side of the main body 10. The representative jigsaw 1 preferably utilizes the cooling air for the motor 11 in order to limit the extent of scattering of the cutting chips.

The electric motor 11 may be coupled to a cooling fan 13 that is mounted on an output shaft 11a of the motor 11. A buffer plate 14 may be mounted within a front opening of the main housing 12 so as to surround the fan 13. A slide switch 15 may be disposed on the upper portion of the main housing 12 and may be operated to start and stop the motor 11.

Preferably, the slide switch 15 can shift or slide in the horizontal direction along the upper surface of the main housing 12 between an ON position (right side position) and an OFF position (left side position) in order to respectively start and stop the motor 11.

When the motor 11 starts to rotate, the fan 13 also may rotate to generate an air stream. Therefore, outside air may be drawn into the main housing 12 via an inlet window (not shown) defined in the rear portion of the main housing 12. For the purposes of illustration, the rear half of the main housing 12 has been omitted in FIG. 2. The air may then flow through the interior of the main housing 12 from the rear side to the front side of the main housing 12 via the motor 11, so that the motor 11 can be cooled.

In order to ensure that the air stream can flow smoothly, the cross-sectional area of the airflow path within the main housing 12 may be narrowed by the buffer plate 14 at a position on the downstream side (left side as viewed in FIG. 2) of the motor 11. This airflow narrowing position may be upstream (right side as viewed in FIG. 2) of the fan 13. Preferably, the fan 13 may be configured as a centrifugal fan, so that the cooling air that passes through the buffer plate 14 may flow mainly in the radial direction from the fan 13 and may then flow along the inner surface of the buffer plate 14. Thus, the space within the buffer plate 14 may define a portion of the airflow path (air channel) on the downstream side of the fan 13.

The output shaft 11a of the motor 11 may include a pinion that engages a drive gear 21 of the drive mechanism 20. The drive mechanism 20 may include a gear casing 22 that is mounted on the front side of the main housing 12. A bearing 23 may be mounted within the gear casing 22 and may rotatably support the output shaft 11a of the motor 11.

The drive gear 21 may be rotatably supported by a shaft 24 via bearings 25. The shaft 24 may be fixed within the gear casing 22. An eccentric boss portion 21a may be formed on the front side (left side as viewed in FIG. 2) of the drive gear 21 and may have a rotational axis that is offset from the rotational axis of the drive gear 21. A counterbalance plate 26 may be rotatably fitted on the boss portion 21a. A slot 26a may be formed in the lower portion of the counterbalance plate 26 and may be elongated in the vertical direction. A pin 27 may be mounted within the gear casing 22 and may extend into the slot 26a so as to limit the rotation of the counterbalance plate 26. Therefore, as the drive gear 21 rotates, the counterbalance plate 26 may swing or pivot in the lateral direction while reciprocating in the vertical direction.

A circular actuation plate 28 may be secured to the front end of the boss portion 21a. A roller 29 may be mounted on the front side of the actuation plate 28 in a position that is offset from the rotational axis of the drive gear 21 (i.e., the rotational axis of the shaft 24). The position of the roller 29 may be offset on the side opposite to the position of the boss portion 21a by an angle of 180° about the rotational axis of the drive gear 21. Therefore, as the drive gear rotates 21, the roller 29 revolves (orbits) about the shaft 24, and the counterbalance plate 26 always moves on the side opposite to the roller 29. As a result, the actuation plate 28 may smoothly rotate without irregularity, and consequently, the roller 29 may revolve smoothly.

A rod casing 17 may be secured to the front side of the gear casing 22. A rod 30 may be slidably received within the rod casing 17 via upper and lower bearings 31 and 32, so that the rod 30 can move vertically relative to the rod casing 17. The lower bearing 32 may receive the rod 30 with a predetermined clearance, so that the lower portion of the rod 30 can move in the diametrical direction of the rod 30 relative to the rod casing 17. According to this arrangement, the lower portion of the rod 30 can move along an elliptical orbit.

A substantially U-shaped guide rail 33 may be secured to the rear side of a substantially central portion of the rod 30 in the vertical direction. The guide rail 33 may have a horizontal recess that receives the roller 33, so that roller 33 can roll along the horizontal recess. Therefore, as the roller 29 revolves due to rotation of the drive gear 21, only the vertical component of the revolution will be transmitted to the guide rail 33. As a result, the rod 30 will vertically reciprocate. During one rotation of the drive gear 21, the roller 29 may make one revolution to thereby cause one reciprocal movement of the rod 30 in the vertical direction. Additional techniques for designing the drive mechanism 20 are provided in U.S. Patent Publication No. 2002-0032968, the contents of which are hereby incorporated by reference as if fully set forth herein.

A pair of leaf springs 34 (only one leaf spring is shown in the drawings) may be attached to the front side on both ends of the guide rail 33. The leaf springs 34 may extend downward from the guide rail 33 and may contact respective compression coil springs 35 that are mounted on the rod casing 17. The leaf springs 34 may cooperate with the coil springs 35 in order to provide a biasing force that urges the rod 30 towards the rearward direction (the right direction as viewed in FIG. 2).

A blade mounting device 36 may be provided at the lower end of the rod 30. An upper end of the blade B may be inserted into the blade mounting device 36 and may be fixed in position. In the mounted state, the blade B may extend substantially along the longitudinal axis of the rod 30. An inner rod 40 may be threadably engaged within the rod 30. A hexagonal nut 40a may be secured to the upper end of the inner rod 40 and may be inserted into the corresponding hexagonal hole that is defined within an outer sleeve 40b. Therefore, the inner rod 40 can rotate together with the sleeve 40b, while the inner rod 40 can move relative to the sleeve 40b in the axial direction. The sleeve 40b may be fixed to the lower portion of a handle 41 that is rotatably mounted within a front housing 16.

The front housing 16 may be disposed so as to cover the upper side of the gear casing 22 and the rod casing 17. The inner rod 40 may extend downward through the rod 30 into the blade mounting device 36. A blade receiving slot (not shown) may be defined within the lower end of the inner rod 40 and may receive the upper base end of the blade B. As the handle 41 rotates, the inner rod 40 may rotate together with the sleeve 40b. If the inner rod 40 is threadably engaged within the rod 30, the inner rod 40 can move vertically relative to the rod 30 as the inner rod 40 rotates.

The blade mounting device 36 may be configured so as to open and close the blade receiving slot of the lower end of the inner rod 40. In this case, the upper base end of the blade B can be released and clamped in response to the vertical position of the inner rod 40. Additional techniques for designing the blade mounting device are provided in U.S. Patent Publication No. 2002-0017026 and U.S. patent application Ser. No. 10/083,639, the contents of which are hereby incorporated by reference as if fully set forth herein.

A guard frame 42 may be attached to the rod casing 17 and may be disposed on the front side of the rod 30 and the blade B. In this case, the rod 30 and the blade B may be prevented from interfering with other articles or devices during the cutting operation. The guard frame 42 may extend vertically downward from the front lower corner portion of the rod casing 17. For example, the guard frame 42 may be made of a wire or a steel bar that is bent to have a substantially U-shaped configuration.

The shoe 60 may be mounted on the lower side of the gear casing 22 and may extend forwardly of the gear casing 22 across the space below the drive mechanism 20. The shoe 60 may be adapted to be placed on an upper surface of a workpiece W. A support 60a may be formed on an upper surface of the shoe 60 and may have a substantially semi-circular configuration in vertical section. The support 60a may be received within a recess 22b that is defined within the bottom surface of the gear casing 22. The recess 22b may have a substantially semi-circular configuration in vertical section and preferably corresponds to the configuration of the support 60a.

A fixing screw 61 may extend through the support 60a and the bottom of the recess 22b of the gear casing 22 and may serve to fix the support 60a in position relative to the recess 22b. A lever 62 may be coupled to the fixing screw 61 and may be operable by the operator to tighten and loosen the fixing screw 61. When the fixing screw 61 has been loosened, the shoe 60 can be inclined laterally relative to the gear casing 22 with the aid of the sliding contact between the support 60a and the bottom of the recess 22b. In other words, the main body 10 (including the drive mechanism 20) can be inclined laterally relative to the shoe 60 that is placed on the workpiece W. Therefore, when the blade B is inclined laterally relative to the workpiece W, an inclined cutting operation can be performed.

An airflow channel 45 may be defined within the lower portion of the gear casing 22. The airflow channel 45 may include an upstream-side opening that communicates with a space 14a that is defined within the buffer plate 14 on the downstream side of the fan 13. Therefore, the stream of cooling air produced by the fan 13 may flow along the inner surface of the buffer plate 14 and then may flow into the airflow channel 45.

In addition, the airflow channel 45 may include a downstream-side opening that communicates with an inner space 50a defined within a tubular support shaft 50. The support shaft 50 may be mounted on the lower portion of the rod casing 17 in a position rearward of the blade B. For example, the support shaft 50 may be fixed in position relative to the rod casing 17, so that the support shaft 50 cannot rotate or move along the axial direction.

Figure 5:
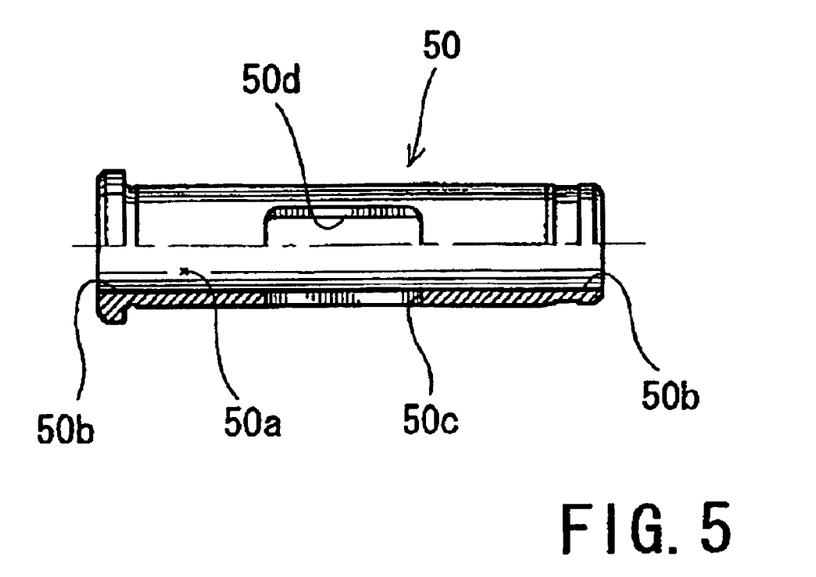
FIG. 5 is a front view of the support shaft with its lower half shown in vertical cross-sectional view.
Figure 6:
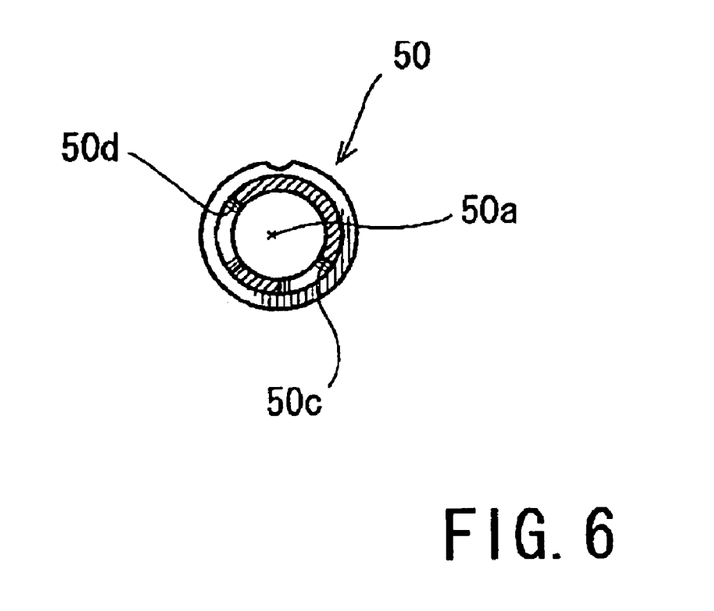
FIG. 6 is a cross-sectional view of the support shaft.

As shown in FIGS. 5 and 6, the support shaft 50 may have a cylindrical, or substantially cylindrical, configuration. In addition, the interior of the support shaft 50 may be substantially hollow. Both ends of the support shaft 50 may be open, thereby defining open ends 50b. The open ends 50b of the support shaft 50 may be configured as connecting ends for receiving an air-exhaust nozzle 56. For example, the support shaft 50 may include an exhaust opening 50c and an inlet port 50d that are defined on the lateral side of the support shaft 50 and are spaced from each other by an angle of 120° around the circumferential (peripheral) direction of the support shaft 50. The exhaust opening 50c may serve to exhaust the cooling air. In addition, the inlet port 50d may permit the cooling air to enter the space 50a defined within the support shaft 50.

Referring back to FIGS. 1 and 2, the support shaft 50 may vertically pivotally support a holder 51. A backup roller 52 may be rotatably mounted on the front portion of the holder 51. The backup roller 52 may contact the rear side edge of the blade B (e.g., the blade edge that is opposite to the moving direction of the jigsaw 1 during the cutting operation or the right side edge as viewed in FIG. 2). Therefore, the backup roller 52 can rotate along the rear side edge of the blade B as the blade B vertically reciprocates. The backup roller 52 may serve to support the rear side edge of the blade B so as to apply a thrust force against the blade B in the cutting direction during the cutting operation.

The backup roller 52 may change between two positions in the forward and rearward directions, so that the width in the forward and rearward directions of the elliptical orbit of the movement of the blade B can be changed. In order to provide this function, a switch plate 53 may be attached to the base portion of the holder 51. The rear end of the switch plate 53 may extend into the gear casing 22. A switch rod 54 may be rotatably supported within the gear casing 22 and may include a portion having a semi-circular cross section, which portion preferably contacts the upper surface of the rear end of the switch plate 53. The switch rod 54 may restrain or restrict the movement of the switch 53 in the upward direction. Therefore, the switch rod 54 can restrain or restrict the movement of the backup roller 52 in the rearward direction (right direction as viewed in FIG. 2).

Referring to FIG. 1, a switch lever 55 may be attached to one end of the switch rod 54 and may be positioned on the outside of the gear casing 22. Therefore, the operator can rotate the switch lever 55 from the outside of the gear casing 22 so as to change the rotational position of the switch rod 54. When the switch rod 54 is rotated by an angle of 90° from the position shown in FIG. 2, the switch plate 53 can be moved further upward by a distance corresponding to the radius of the switch rod 54. Therefore, the backup roller 52 can move further rearward from the position shown in FIG. 2 in order to increase the width of the elliptical orbit of the movement of the blade B.

Figure 3:
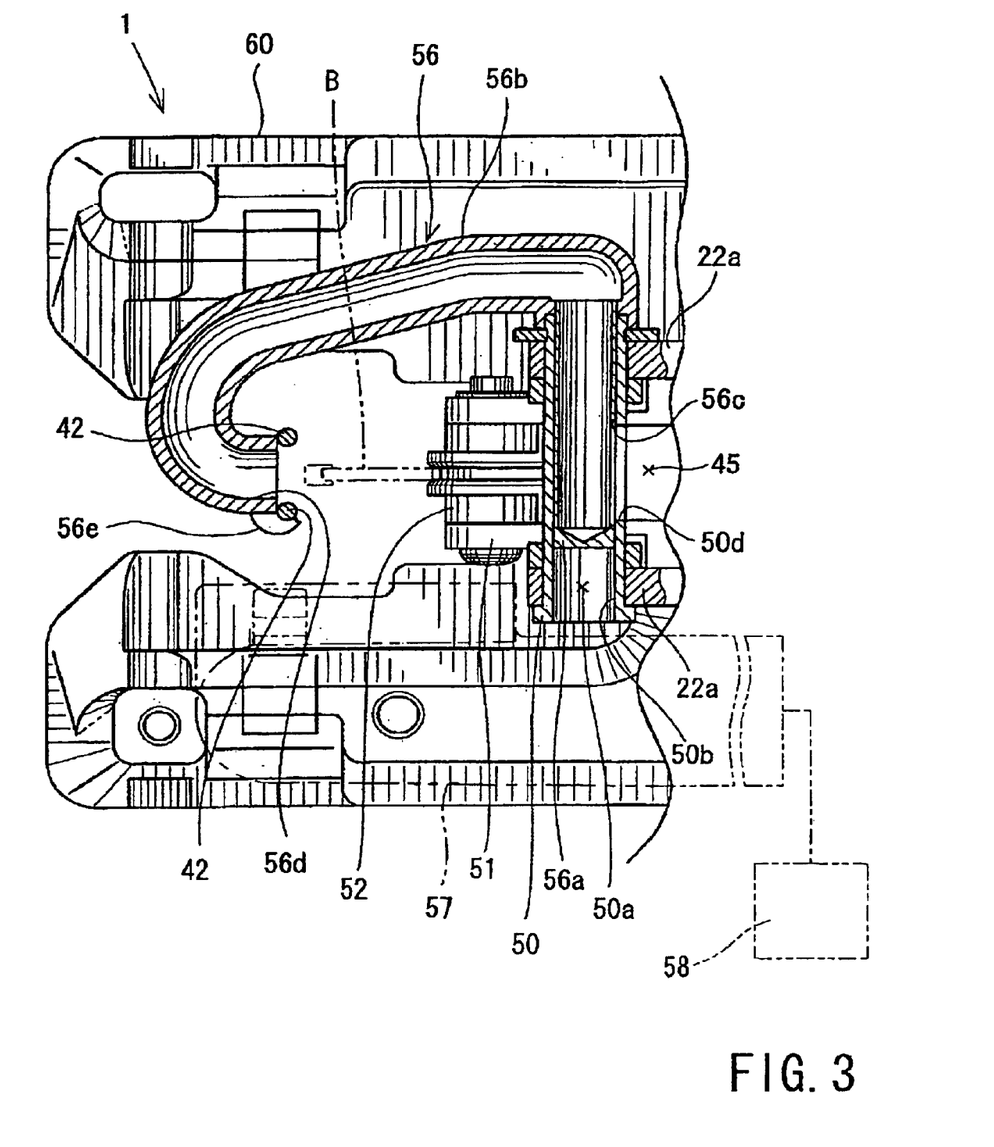
FIG. 3 is plan view of a part of the first representative jigsaw with an air-exhaust nozzle and a support shaft shown in horizontal cross-sectional views.

The holder 51 and various parts disposed around the holder 51 are shown in further detail in FIG. 3. A pair of parallel support edges 22a may extend from the lower portion of the rod casing 17. The support shaft 50 may be supported between the support edges 22a such that the support shaft 50 cannot rotate or move along the axial direction. In this supported position, the inlet port 50d may be oriented rearward and may oppose to the opening on the downstream side of the airflow channel 45. As a result, the airflow channel 45 may communicate with the space 50a defined within the support shaft 50.

Figure 4:
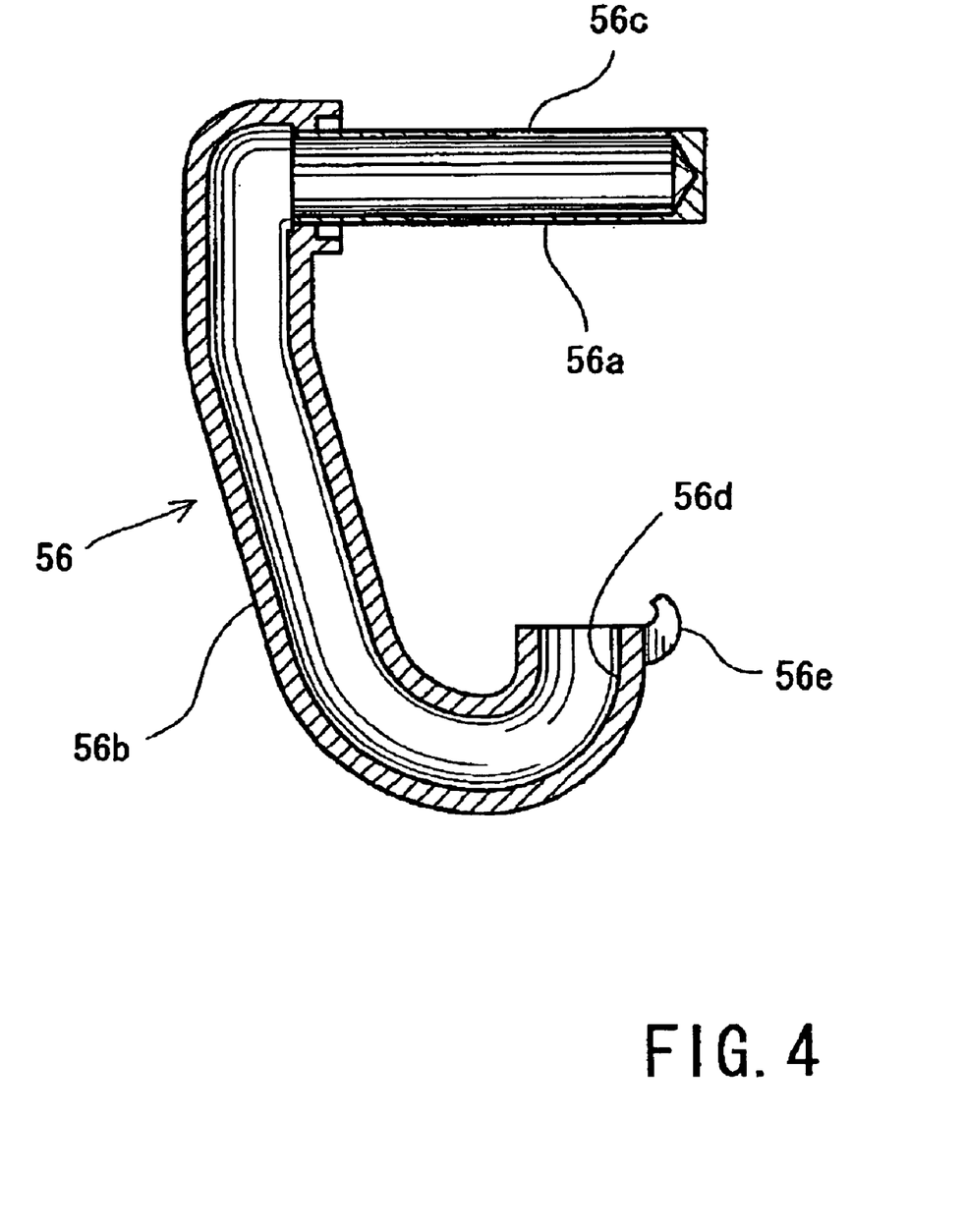
FIG. 4 is a cross-sectional view of the air-exhaust nozzle.

As shown in FIGS. 3 and 4, the air-exhaust nozzle 56 may include a substantially J-shaped nozzle portion 56b that is connected to one end of an insertion tube portion 56a. The insertion tube portion 56a may be inserted into the space 50a within the support shaft 50. For example, the outer diameter (dimension) of the insertion tube portion 56a may be set such that the insertion tube portion 56a closely fits into the support shaft 50 without any substantial clearance. An inlet port 56c may be defined on the lateral side of the insertion tube portion 56a. The inlet port 56c preferably aligns with the inlet port 50d defined in the support shaft 50 when the insertion tube portion 56a is fitted into the support shaft 50. Further, when the insertion tube portion 56a is fitted into the support shaft 50, the insertion tube portion 56a preferably closes the exhaust opening 50c of the support shaft 50.

One end of the nozzle portion 56b may be sealingly connected to one end of the insertion tube portion 56a. The interior space of the nozzle portion 56b preferably communicates with the interior space of the insertion tube portion 56a. An engaging hook 56e may be secured to the outer surface of the other end of the nozzle portion 56b, which end may be formed as an exhaust opening 56d. The engaging hook 56e may engage the guard frame 42, so that the nozzle portion 56b can be attached to the guard frame 42.

In order to construct the arrangement shown in FIG. 3, the insertion tube portion 56a of the air exhaust nozzle 56 may be fitted into the support shaft 50 from one end 50b on the upper side as viewed in FIG. 3. Then, the nozzle portion 56b may be disposed so as to detour around (avoid) the blade B. As a result, the exhaust opening 56d will oppose the blade B in the moving direction of the blade B, i.e., the direction of movement of the blade B during the cutting operation (the left side direction as viewed in FIG. 3). Thereafter, the engaging hook 56e may be engaged with the guard frame 42.

Upon completion of this assembling operation, the inlet port 56c of the insertion tube portion 56a preferably automatically aligns with the inlet port 50d of the support shaft 50. Therefore, the airflow channel 45 will communicate with the interior space of the insertion tube portion 56a. When the motor 11 is started, the fan 13 may generate a stream of cooling air that enters into the space 14a within the buffer plate 14, as shown in FIG. 2. The stream of cooling air may then flow through the airflow channel 45, the inlet ports 50d and 56c, the interior of the insertion tube portion 56a and the nozzle portion 56b. The cooling air may subsequently flow out of the nozzle portion 56b via the exhaust opening 56d of the nozzle portion 56b.

If the nozzle portion 56b is bent so as to have a substantially J-shaped configuration, the exhaust opening 56d may be positioned on the front side of the blade B and may be oriented rearward toward the blade B. As a result, the cooling air may be blown out of the exhaust opening 56d in the direction from the front side to the rear side of the blade B (i.e., around the blade B).

A cutting chip collection nozzle 57 is shown in FIG. 3 and the cutting chip collection nozzle 57 may be mounted on the upper surface of the shoe 60 shown in FIG. 2 in a position on the lateral side of the blade B (i.e. the cut portion of the workpiece W where the blade B intersects with the workpiece W). A chip collector (e.g., a vacuum device or a suction device) 58, may be connected to the collection nozzle 57 (see FIG. 3). Therefore, when the chip collector 58 is driven, the cutting chips produced at the cut portion may be drawn or suctioned into the collection nozzle 57. Preferably, a nozzle end of the collection nozzle 57 may be oriented obliquely downward, so that the opening of the nozzle end opposes or faces the cut portion of the workpiece W.

According to the first representative jigsaw 1, when the slide switch 15 is shifted to the ON position, the electric motor 11 starts to vertically reciprocate the blade B by means of the drive mechanism 20. Therefore, the workpiece W can be cut. At the same time, the fan 13 rotates with the motor 11, so that outside air is drawn or suctioned into the main housing 12 from the rear side of the main body 10. The drawn air then flows forwardly through the main housing 12, so that the motor 11 can be cooled.

After cooling the motor 11, the cooling air flows into the space 14a within the buffer plate 14 and further flows into the insertion tube portion 56a of the air-exhaust nozzle 56, i.e. the space 50a within the support shaft 50, via the airflow channel 45 and the inlet ports 50d and 56c. This air stream may then flow into the nozzle body 56 and may be exhausted from the exhaust opening 56d of the nozzle body 56. If the exhaust opening 56d is positioned on the front side of the blade B and is oriented rearward toward the blade B, the air stream may moderately flow from the front side toward the rear side of the blade B. Therefore, the air stream may serve as an air curtain that blocks off the front side of the cut portion. As a result, the cutting chips, which may be blown upward from the cut portion, may be prevented from scattering forwardly beyond the air curtain. In other words, cutting chips may be limited or restricted from scattering primarily toward the front side of the cutting portion.

Because the motor cooling air that is exhausted from the exhaust opening 56d of the air-exhaust nozzle 56 may limit the extent of the scattered cutting chips primarily to the front side of the cutting portion, a transparent cover is not required, as in the known art. Therefore, in the first representative embodiment, cutting chips will not stick to a transparent cover and prevent the operator from observing the cut portion, which is problem of known cutting tools.

In addition, if the scattered cutting chips arc limited primarily to the front side of the cutting portion, the collection nozzle 57 can collect the cutting chips. Therefore, the cutting chips may be collected more efficiently for disposal.

Further, according to the arrangement of the first representative jigsaw 1, the air-exhaust nozzle 56 may be removed from the jigsaw 1 by (1) removing the engaging hook 56e from the guard frame 42 and then (2) removing the insertion tube portion 56a from the space 50a of the support shaft 50. When the insertion tube portion 56a is removed from the space 50a of the support shaft 50, the exhaust opening 50c of the support shaft 50 may be opened or exposed. For example, the opening 50c may be oriented or directed obliquely downward toward the outside. In this case, the drawn air within the space 50a of the support shaft 50 may flow directly toward the cut portion of the workpiece W. Therefore, any cutting chips that have blown upward from the cut portion may be urged forwardly of the cut portion. This arrangement also permits easy observation of the cut portion during the cutting operation, so that cutting efficiency can be improved.

As described above, if the cutting chips are prevented from substantially scattering, thereby ensuring that the operator can easily and reliably observe the cut portion, the cutting chips can be efficiently collected by the collection nozzle 57 and the collector 58 without using a transparent cover, as was required in known jigsaws. If the cutting chips are not required to be collected, the air-exhaust nozzle 56 may be removed from the jigsaw 1. In this case, the cutting chips can be efficiently exhausted forwardly of the cut portion. In either case, the cut portion can be easily and reliably observed with the aid of the motor cooling air and without using a transparent cover.

The first representative jigsaw 1 may be modified in various ways. For example, in order to mount the air-exhaust nozzle 56 on the jigsaw 1, the insertion tube portion 56a of the air-exhaust nozzle 56 is fitted into the support shaft 50 from one end 50b on the upper side as viewed in FIG. 3. Then, the nozzle portion 56b engages the guard frame 42 while the nozzle portion 56b is routed to extend on the right side (upper side as viewed in FIG. 3) of the blade B in order to avoid the blade B. However, the insertion tube portion 56a of the air-exhaust nozzle 56 may be fitted into the support shaft 50 from the other end 50b on the lower side as viewed in FIG. 3. Then, the nozzle portion 56b may be routed to extend on the left side (lower side as viewed in FIG. 3) of the blade B in order to avoid blade B. The position of the air-exhaust nozzle 56 may be selectively chosen in response to the type of cutting operation that will be performed.

Further, although the support shaft 50 includes connecting ends 56b on both sides in the first representative jigsaw 1, only one connecting end 50b may be provided and the other end may be closed. In this case, the air exhaust nozzle 56 may be always fitted onto the support shaft 50 in a fixed position.

Furthermore, although the air exhaust nozzle 56 includes the insertion tube portion 56a that is fitted into the space 50a of the support shaft 50 in order to connect the air exhaust nozzle 56 to the support shaft 50 in the first representative jigsaw 1, the insertion tube portion 56a may be omitted. In such case, the nozzle portion 56b may be directly connected to one of the connecting ends 50b of the support shaft 50 so that the motor cooling air may directly flow into the space 50a of the support shaft 50. In this modification, the air-blowing opening 50c and the other connecting end 50b of the support shaft 50 may be closed by appropriate closure members.

In addition, the air exhaust nozzle 56 may be omitted, so that the air stream may always directly flow out from the opening 50c. In such an embodiment, the cutting chips also may be urged forwardly from the cut portion. Therefore, the cut portion can be easily observed, while the motor cooling air can be efficiently utilized. Moreover, in this embodiment, the support shaft 50 is not required to have open ends on the opposite sides. Therefore, the support shaft 50 may be formed as a solid shaft with a through-hole defined in the diametrical direction. In such case, the ends of the through-hole may respectively correspond to the inlet port 50d and the exhaust opening 50c.

Figure 7:
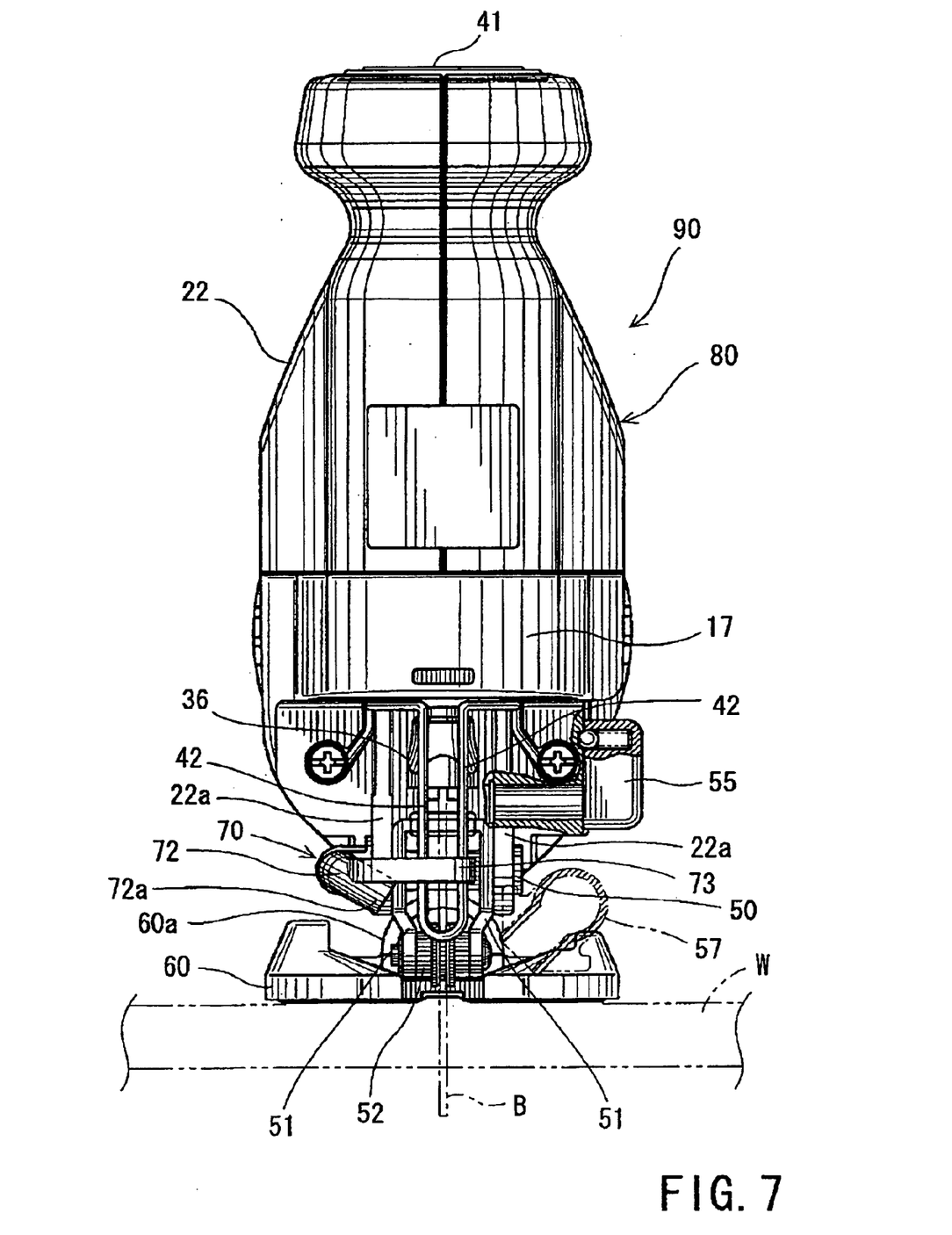
FIG. 7 is a front view of a second representative jigsaw.

A second representative jigsaw 90 will now be described with reference to FIGS. 7 and 8. The second representative jigsaw 90 is different from the first representative jigsaw 1 in the configuration of the air-exhaust nozzle and the position of the exhaust opening of the air-exhaust nozzle. In other respects, the construction (such as the construction of the main body 10, the drive mechanism 20 and the shoe 60) is substantially the same as the first representative jigsaw. Therefore, the same reference numerals are affixed to the same parts as the first representative jigsaw 1 and further description of these parts is not necessary.

Figure 8:
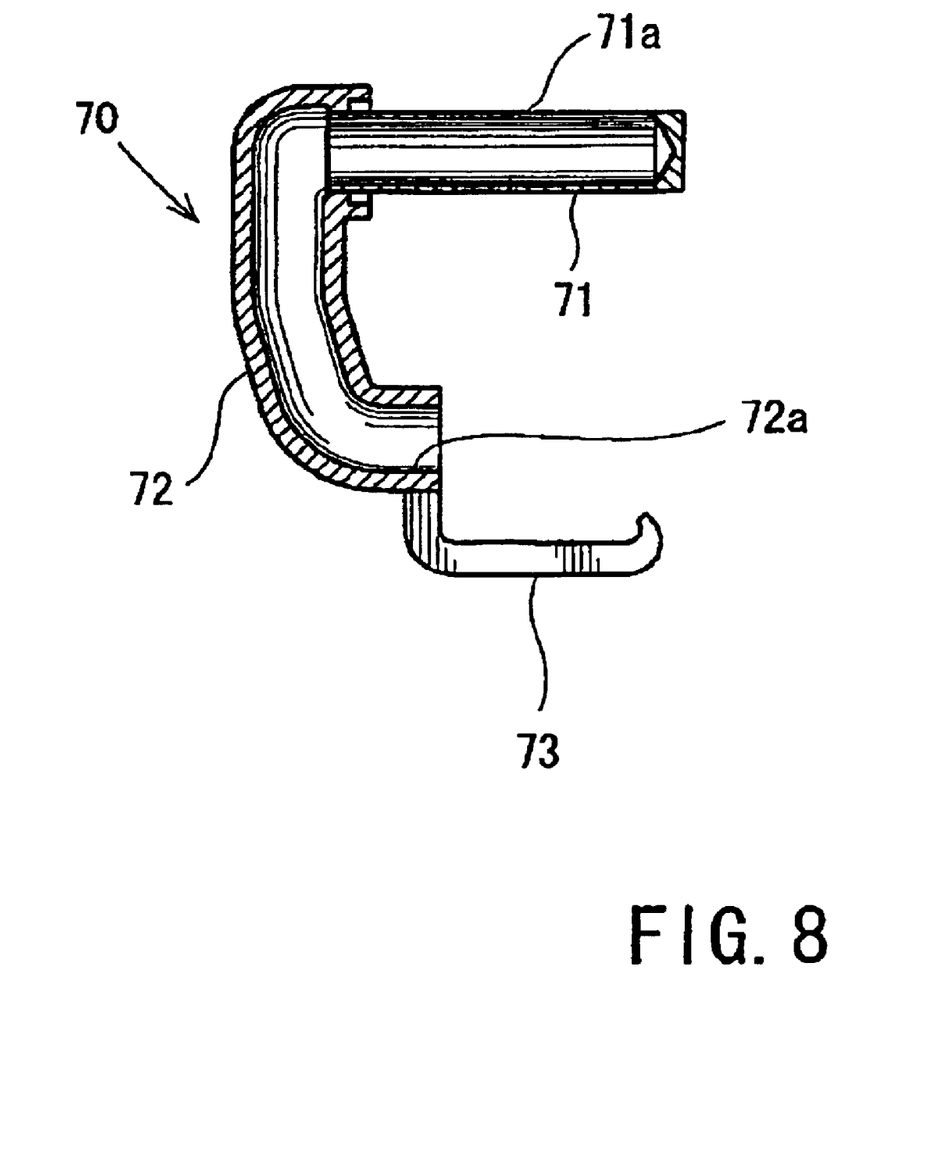
FIG. 8 is a horizontal cross-sectional view of an air-exhaust nozzle of the second representative jigsaw.

Referring to FIG. 8, an air-exhaust nozzle 70 of the second representative jigsaw 90 may include an insertion tube portion 71 and a nozzle portion 72. The insertion tube portion 71 may be similar to the insertion tube portion 56a of the first representative jigsaw 1. However, the nozzle portion 72 is different from the nozzle portion 56b of the first representative jigsaw 1 in that the nozzle portion 72 has a substantially L-shaped configuration and has a shorter length. The insertion tube portion 71 may have an opening 71a similar to the opening 56c of the insertion tube portion 56a. An air exhaust opening 72a may be defined at one end opposite to the insertion tube portion 71. An engaging hook 73 may be attached to the lateral side of the one end and may be greater in size than the engaging hook 56e. As shown in FIG. 7, the exhaust opening 72a may be directed obliquely downward relative to the insertion tube portion 71 and the engaging hook 73.

The air-exhaust nozzle 70 of the second representative jigsaw 90 may be mounted on the jigsaw 90 by (a) fitting the insertion tube portion 71 into the tubular support shaft 50 via one of the connecting ends 50b and (b) engaging the engaging hook 73 with the guard frame 42. Therefore, the engaging hook 73 will extend across the front side of the guard frame 42. In this mounted state, the exhaust opening 72a of the nozzle portion 72 may be positioned laterally of the blade B and may be oriented (directed) toward the cut portion of the workpiece W. Therefore, the motor cooling air produced by the fan 13 may flow through the airflow channel 45, the opening of the support shaft 50, the opening 71a of the insertion tube portion 71 and the interior of the insertion tube portion 71, i.e. the space 50a within the support shaft 50. The cooling air may then flow out from the lateral side of the blade B toward the cut portion of the workpiece W through the exhaust opening 72a.

In this embodiment, the air exhaust nozzle 70 may be disposed on the side opposite to the chip collection nozzle 57 with respect to the blade B. Therefore, the motor cooling air may be moderately blown out (exhausted) from the lateral side of the blade B, which side is opposite to the side of the cutting chip collection nozzle 57, toward the cut portion. For this reason, the cooling air may prevent the cutting chips that are blown up from the cut portion from scattering to a position away from the collection nozzle 57. As a result, the collection nozzle 57 may efficiently collect the cutting chips.

Further, in the second representative jigsaw 90, the cooling air may be directly exhausted through the exhaust opening 50c of the support shaft 50 toward the cut portion by removing the air exhaust nozzle 70. That is, the inserting tube portion 71 may be removed from the space 50a of the support shaft 50. Therefore, the cutting chips may be blown forwardly of the blade B.

Although the exhaust opening 72a of the nozzle body 72 is oriented (directed) obliquely downward in the second representative jigsaw 90, the exhaust opening 72a may be oriented (directed) substantially horizontally. Further, according to this arrangement, the cutting chips may be prevented from scattering to a position away from the collection nozzle 57. In addition, the air exhaust nozzle 70 may be positioned on the side opposite to the position shown in FIG. 7 with respect to the blade B by fitting the insertion tube portion 71 onto the other connecting end 50b of the support shaft 50. In such case, the chip collection nozzle 57 may be positioned on the side opposite to the position shown in FIG. 7 with respect to the blade B. Therefore, the same operation and effects can be attained as described in connection with the second representative embodiment.

A third representative jigsaw 100 will now be described with reference to FIGS. 9 to 12. This representative embodiment also may utilize the same basic construction (the construction of the main portion 10, the drive mechanism 20 and the shoe 60) as the first representative jigsaw 1. Therefore, the same reference numerals are affixed to the same parts and further description of these parts is not necessary.

Figure 11:
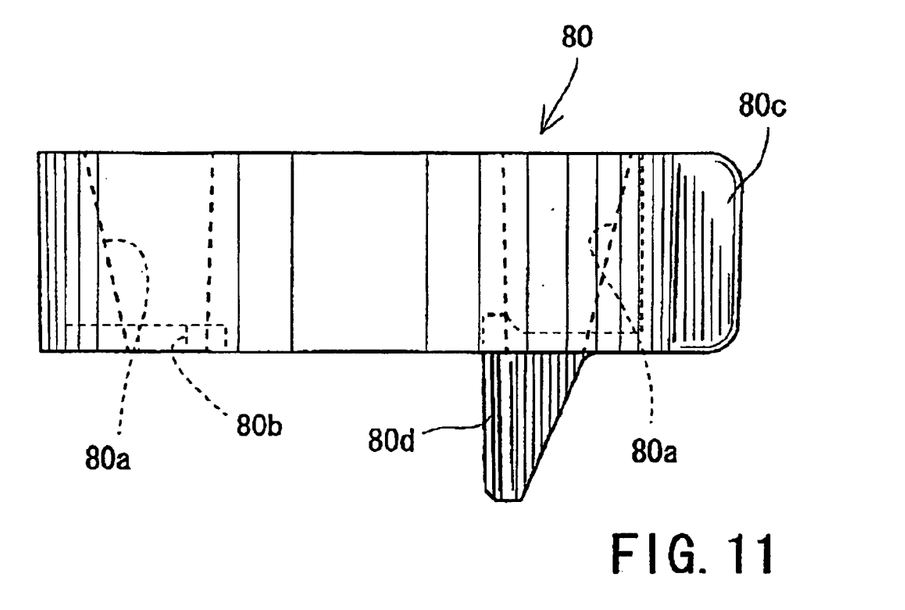
FIG. 11 is a front view of a cover of the third representative jigsaw.
Figure 12:
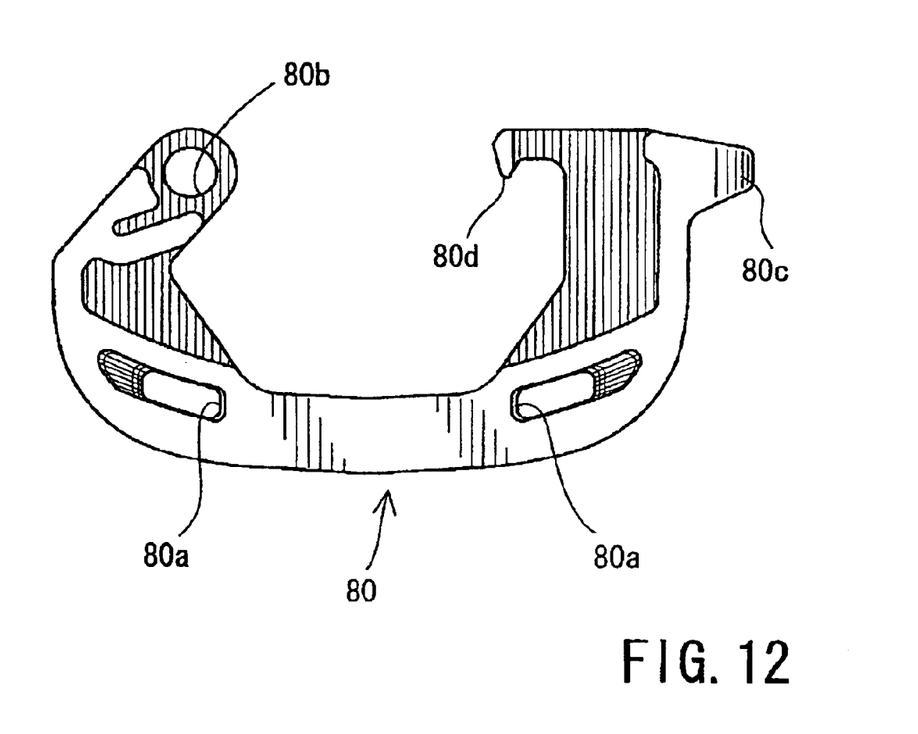
FIG. 12 is a plan view of the cover of FIG. 11.

The third representative jigsaw 100 may include a cover 80 that may be positioned on the front lower side of the drive mechanism 20. Cover 80 also may be referred to as a collar 80. The cover (collar) 80 may serve to block off the front side of a blade holder (blade mounting device) 86. FIGS. 11 and 12 respectively show the cover 80 in front view and plan view. As shown in FIG. 12, the cover 80 may have a substantially U-shaped configuration. A support hole 80b may be defined within one end of the cover 80. A vertical support shaft 81 may extend downward from the lower corner portion of the front side of the rod casing 17 (see FIG. 9). The support shaft 81 may be inserted into the support hole 80b of the cover 80. In this case, the cover 80 may not be removed from the support shaft 81. However, the cover 80 may pivot about the support shaft 81 within a horizontal plane on the front lower side of the drive mechanism 20.

For example, the cover 80 may pivot between an open position and a closed position. When the cover 80 is in the closed position, the cover 80 may extend along the front surface of the rod casing 17 and may cover the front side of the blade holder 86. Therefore, the blade holder 86, i.e. the mounting portion of the blade B, may be prevented from interfering with foreign articles. On the other hand, when the cover 80 is in the open position, the front side of the blade holder 86 may be exposed to the outside. In this case, an old blade B can be easily removed and a new blade B can be easily inserted into the blade holder 86. The blade holder 86 may be disposed at the lower end of a rod 87, which rod 87 may be similar to the rod 30 of the first and second representative jigsaws 1 and 90.

The blade holder 86 of the third representative jigsaw 100 may be different from the blade mounting portion 36 of the first and second representative jigsaws 1 and 90. For example, the blade holder 86 may have an annular configuration and may be mounted on the lower end of the rod 87 such that the blade holder 86 can rotate relative to and about the rod 87. A slot (not shown) may be defined in the lower end of the rod 87 and may be configured to receive the upper base end of the blade B. The slot may close when the blade holder 86 rotates in one direction and open when the blade holder 86 rotates in the opposite direction. Thus, the blade B can be mounted in and removed from the blade holder 86.

Referring to FIGS. 11 and 12, a pair of vertical slots 80a may be defined in the cover 80 and may extend through the cover 80 between the upper surface and the lower surface of the cover 80. As shown in FIG. 11, each of the vertical slots 80a may be tapered in the downward direction. Therefore, the upper opening of each vertical slot 80a is preferably larger than the lower opening of each vertical slot 80a.

Figure 9:
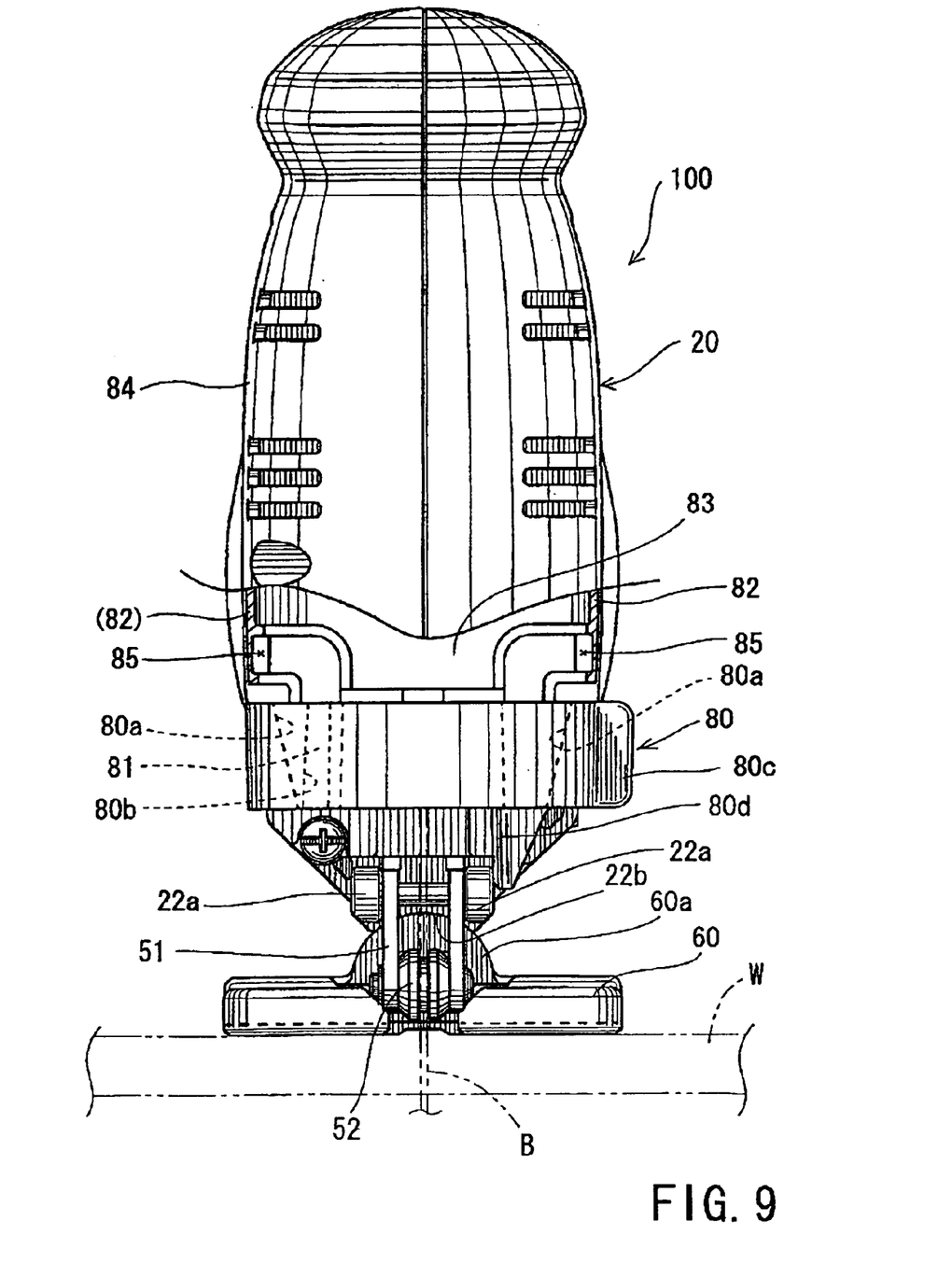
FIG. 9 is a front view of a third representative jigsaw.

The width of the cover 80 in the vertical direction may be determined to have an appropriate size as shown in FIG. 9, so that the cover 80 does not prevent the operator from observing the cut portion of the workpiece.

An engaging hook 80d may be defined on the other end 80c of the cover 80 opposite to the support hole 80b. The engaging hook 80d may engage the corresponding engaging edge (not shown) formed on the blade holder 86, so that the blade holder 86 can rotate as the cover 80 pivots. For example, as the cover 80 pivots to open, the blade holder 86 may rotate to release or unclamp the blade B. On the other hand, as the cover 80 pivots to the closed position, the blade holder 86 may rotate to fix or clamp the blade B. Therefore, it is not necessary for the operator to directly rotate the blade holder 86, because the mounting and removing operation of the blade B can be performed by opening and closing the cover 80. Further description of cover 80 can be found in U.S. patent application Ser. No. 10/083,639, which was incorporated by reference above.

Figure 10:
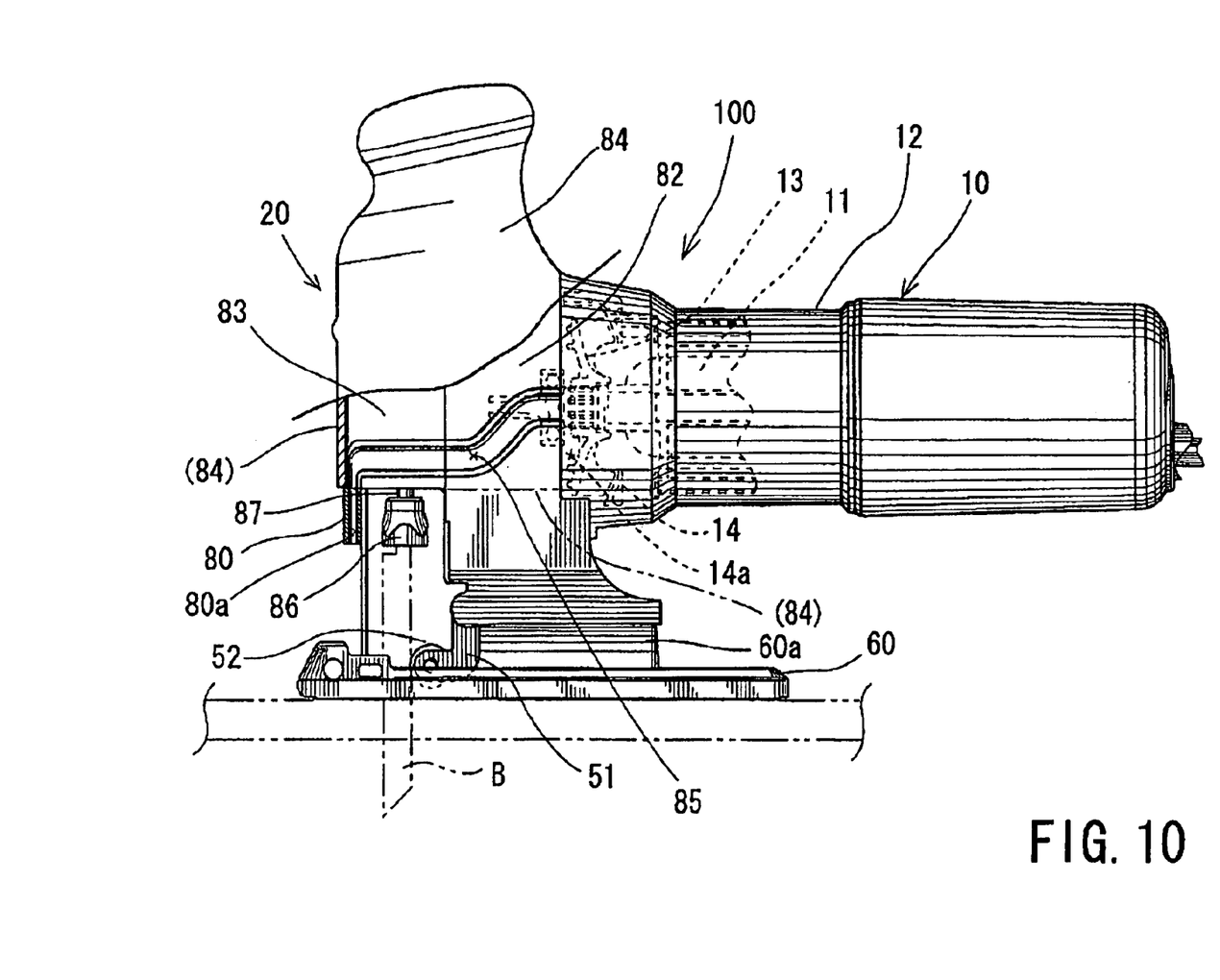
FIG. 10 is a side view of the third representative jigsaw with a lower portion of a front housing broken away in order to show a gear casing and a rod casing.

Referring to FIG. 10, the third representative jigsaw 100 may include a front housing 84 that covers substantially the upper half of a gear casing 82. The drive gear 21, the counterbalance plate 26 and the other associated parts may be disposed within the front housing. Further, the front housing 84 also may cover the outer surface of a rod casing 83 that vertically movably supports the rod 87.

Referring to FIGS. 9 and 10, a pair of airflow channels 85 may extend through the spaces defined between the lateral surfaces of the gear casing 82 and the inner surface of the front housing 84 and also through the spaces defined between either lateral surfaces of the rod casing 83 and the inner surface of the front housing 84. One end of each of the airflow channels 85 may be connected to and communicate with the space 14a that is defined within the buffer plate 14 on the downstream side of the fan 13. The other end of each of the airflow channels 85 may be connected to and communicate with the upper opening of the corresponding vertical slot 80a defined in the cover 80 when the cover 80 is disposed in the closed position shown in FIGS. 9 and 10.

According to this third representative jigsaw 100, when the electric motor 11 is started, the fan 13 may rotate to produce motor cooling air that enters the main housing 12 from the rear side. The cooling air may then flow through the main housing 12 toward the front side. Therefore, the motor 11 may be cooled in the same manner as the first and the second representative jigsaws. The cooling air may then flow into the airflow channels 85 via the space 14a within the buffer plate 14 on the downstream side of the fan 13. When the cover 80 is closed, the airflow channels 85 communicate with the corresponding vertical slots 80a defined in the cover 80. Therefore, the cooling air may flow through vertical slots 80a and then may flow downward from the vertical slots 80a via the lower openings.

If the vertical slots 80a are configured to be tapered in the downward direction, the cross sectional area of each of the vertical slots 80a gradually decreases in the downward direction. Therefore, the flow rate of the cooling air may increase in the downstream side direction. The cooling air having the increased flow rate may flow downward from the cover 80. As a result, an air curtain may be generated on the front side of the blade B. Therefore, the scattering extent of the cutting chips that may be blown up from the cut portion of the workpiece W may be limited with respect to the forward direction of the blade B.

If the extent of cutting chip scattering is limited by the airflow from the slots 80a defined within the cover 80 as described above, the cutting chips may be efficiently collected by the cutting chip collection nozzle 57 (not shown in FIGS. 9 and 10). The cutting chip collection nozzle 57 may be positioned proximal to the cut portion of the workpiece W in the same manner as the first and second representative embodiments. Also, it is not necessary to incorporate a transparent cover.

The third representative jigsaw 100 may be modified in various ways. For example, although two slots 80a are defined in the cover 80, only one slot or three or more slots may be provided.

In the first to third representative embodiments, the motor cooling air that is generated by the fan 13 of the main body 10 is exhausted toward the cut portion or around the cut portion and an additional blower is not required. Therefore, the cut portion can be easily observed while providing improved reciprocating cutting tools that can be manufactured at a relatively low cost. In addition, because no additional blower is required, the reciprocating cutting tools can be easily and reliably handled during a cutting operation.

What is claimed is:

1. An apparatus comprising:
    a drive source arranged and constructed to reciprocally drive a blade;
    a blower arranged and constructed to be driven by the drive source so as to produce an air stream;
    an air channel arranged and constructed to guide the air stream to a position adjacent to the blade or a workpiece that will be cut by the blade;
    a chip collecting device arranged and constructed to draw cutting chips away from the workpiece that has been cut by the blade;
    wherein the air channel comprises a first flow channel and a second flow channel, the first flow channel being arranged on the downstream side of the blower so as to receive the air stream, and the second flow channel being arranged on the downstream side of the first flow channel and exhausting the air stream in a predetermined direction;
    a housing that defines a space for accommodating the drive source and the blower, wherein the first flow channel is defined within the housing;
    wherein the second flow channel is removably coupled to the first flow channel;
    wherein the first flow channel includes at least first and second connecting portions, wherein the second flow channel can be selectively connected to either one of the first and second connecting portions;
    wherein the second flow channel includes a nozzle portion and a connecting portion, the nozzle portion having a first exhaust opening, and the connecting portion being configured for connection to the first flow channel; and
    wherein the first flow channel includes a first inlet port that receives the air stream from the blower, and the connecting portion of the second flow channel includes a second inlet port that communicates with the first inlet port.

2. An apparatus as in claim 1, wherein the drive source comprises an electric motor, and the air channel is positioned to cause the air stream produced by the blower to flow through or around the motor in order to cool the motor.

3. An apparatus as in claim 2, wherein the blower comprises a fan that is mounted on an output shaft of the motor.

4. An apparatus as in claim 3, further including a reciprocating drive mechanism coupled to the drive source and the blade in order to reciprocate the blade.

5. An apparatus as in claim 1, wherein the first flow channel further includes a second exhaust opening that is displaced from the first inlet port, the second exhaust opening being closed when the connecting portion is connected to the first flow channel.

6. An apparatus as in claim 1, wherein the first flow channel and the connecting portion each have tubular configurations and are sized such that the connecting portion is closely fitted into the first flow channel.

7. An apparatus as in claim 6, wherein the second flow channel includes a hook for engaging a fixed portion of the housing.

8. An apparatus as in claim 7, wherein the first flow channel is defined within a support shaft that pivotally supports a backup device for the blade.

9. An apparatus as in claim 7, wherein the second flow channel is configured to exhaust the air stream in a rearward direction from the forward position of the blade.

10. An apparatus as in claim 7, wherein the second flow channel is configured to exhaust the air stream in a lateral direction from one of right and left sides to the other side of the blade.

11. An apparatus as in claim 7, wherein the second flow channel is configured to exhaust the air stream in a downward direction at the forward position of the blade.

12. An apparatus as in claim 11, further comprising a cover pivotally disposed on the front side of the blade, wherein the second flow channel is defined within the cover.

13. An apparatus as in claim 11, wherein the cover is pivotally mounted on the housing via a support shaft, whereby the cover can pivot between a closed position for covering the front side of the blade and an open position for exposing the front side of the blade, and wherein the cover is arranged and constructed to detachably engage a blade holder, whereby the blade holder will clamp the blade when the cover pivots to the closed position and will release the blade when the cover pivots to the open position.

14. An apparatus as claim 1, wherein the chip collecting device comprises a suction nozzle that has a suction opening, and the air channel is configured to exhaust the air stream substantially toward the suction opening of the suction nozzle.

15. An apparatus comprising:
   a drive source arranged and constructed to reciprocally drive a blade;
   a blower arranged and constructed to be driven by the drive source so as to produce an air stream;
   an air channel arranged and constructed to guide the air stream to a position adjacent to the blade or a workpiece that will be cut by the blade;
   a chip collecting device arranged and constructed to draw cutting chips away from the workpiece that has been cut by the blade;
   wherein the air channel comprises a first flow channel and a second flow channel, the first flow channel being arranged on the downstream side of the blower so as to receive the air stream, and the second flow channel being arranged on the downstream side of the first flow channel and exhausting the air stream in a predetermined direction;
   wherein the second flow channel is removably coupled to the first flow channel;
   wherein the second flow channel includes a nozzle portion and a connecting portion, the nozzle portion having a first exhaust opening, and the connecting portion being configured for connection to the first flow channel; and
   wherein the first flow channel includes a first inlet port that receives the air stream from the blower, and the connecting portion of the second flow channel includes a second inlet port that communicates with the first inlet port.

16. An apparatus as in claim 15, further including a housing that defines a space for accommodating the drive source and the blower, wherein the first flow channel is defined within the housing.

17. apparatus as in claim 15, wherein the first flow channel includes at least first and second connecting portions, wherein the second flow channel can be selectively connected to either one of the first and second connecting portions.

18. An apparatus as in claim 15, wherein the first flow channel further includes a second exhaust opening that is displaced from the first inlet port, the second exhaust opening being closed when the connecting portion is connected to the first flow channel.

19. An apparatus as in claim 15, wherein the first flow channel and the connecting portion each have tubular configurations and are sized such that the connecting portion is closely fitted into the first flow channel.

20. An apparatus comprising:
   a drive source arranged and constructed to reciprocally drive a blade;
   a blower arranged and constructed to be driven by the drive source so as to produce an air stream;
   an air channel arranged and constructed to guide the air stream to a position adjacent to the blade or a workpiece that will be cut by the blade;
   a chip collecting device arranged and constructed to draw cutting chips away from the workpiece that has been cut by the blade;
   wherein the air channel comprises a first flow channel and a second flow channel, the first flow channel being arranged on the downstream side of the blower so as to receive the air stream, and the second flow channel being arranged on the downstream side of the first flow channel and exhausting the air stream in a predetermined direction;
   a housing that defines a space for accommodating the drive source and the blower, wherein the first flow channel is defined within the housing; and
   wherein the second flow channel includes a hook for engaging a fixed portion of the housing.

21. An apparatus comprising:
   a drive source arranged and constructed to reciprocally drive a blade;
   a blower arranged and constructed to be driven by the drive source so as to produce an air stream;
   an air channel arranged and constructed to guide the air stream to a position adjacent to the blade or a workpiece that will be cut by the blade;
   a chip collecting device arranged and constructed to draw cutting chips away from the workpiece that has been cut by the blade;
   wherein the air channel comprises a first flow channel and a second flow channel, the first flow channel being arranged on the downstream side of the blower so as to receive the air stream, and the second flow channel being arranged on the downstream side of the first flow channel and exhausting the air stream in a predetermined direction; and
   wherein the first flow channel is defined within a support shaft that pivotally supports a backup device for the blade.

22. An apparatus comprising:
   a drive source arranged and constructed to reciprocally drive a blade;
   a blower arranged and constructed to be driven by the drive source so as to produce an air stream;
   an air channel arranged and constructed to guide the air stream to a position adjacent to the blade or a workpiece that will be cut by the blade;
   a chip collecting device arranged and constructed to draw cutting chips away from the workpiece that has been cut by the blade;
   wherein the air channel comprises a first flow channel and a second flow channel, the first flow channel being arranged on the downstream side of the blower so as to receive the air stream, and the second flow channel being arranged on the downstream side of the first flow channel and exhausting the air stream in a predetermined direction; and
   a cover pivotally disposed on the front side of the blade, wherein the second flow channel is defined within the cover.

23. An apparatus as in claim 22, wherein the second flow channel is configured to exhaust the air stream in a downward direction at the forward position of the blade.

24. An apparatus as in claim 23, wherein the exhausted air stream generates an air curtain at the forward position of the blade.

25. An apparatus as in claim 23, wherein the second channel is configured to gradually decrease the cross sectional area in the downward direction.

26. An apparatus as in claim 22, wherein the cover is pivotally mounted on a housing via a support shaft, whereby the cover can pivot between a closed position for covering the front side of the blade and an open position for exposing the front side of the blade, and wherein the cover is arranged and constructed to detachably engage a blade holder, whereby the blade holder will clamp the blade when the cover pivots to the closed position and will release the blade when the cover pivots to the open position.

* * * * *